United States Patent [19]

Wayenberg

[11] Patent Number: 5,570,078
[45] Date of Patent: Oct. 29, 1996

[54] BRAKE SYSTEM FOR PREVENTING UNAUTHORIZED USE OF VEHICLE

[76] Inventor: Albert Wayenberg, 960 - 355 Burrard St., Vancouver, B.C., Canada, V6C 2G8

[21] Appl. No.: 368,298

[22] Filed: Jan. 3, 1995

[51] Int. Cl.⁶ .................................................. B60R 25/10
[52] U.S. Cl. ...................... 340/426; 340/452; 303/89; 180/287
[58] Field of Search ................................ 340/426, 452, 340/453; 303/1, 3, 89, DIG. 3; 188/1.11, 353; 180/287

[56] References Cited

U.S. PATENT DOCUMENTS

| | | | |
|---|---|---|---|
| 4,721,192 | 1/1988 | Cano et al. | 188/353 |
| 4,834,207 | 5/1989 | Havenhill et al. | 180/287 |
| 4,951,776 | 8/1990 | Jeter | 180/287 |
| 5,078,456 | 1/1992 | Cox | 303/89 |

Primary Examiner—Jeffery Hofsass
Assistant Examiner—Julie B. Lieu

[57] ABSTRACT

This invention relates to vehicle theft alarm and prevention devices, and in particular discloses a system that operates on the brakes of a vehicles to prevent the unauthorized use of a vehicle. Upon an unauthorized use of the vehicle, the system causes the brakes of the vehicle to remain engaged to the degree to which the user causes them to be engaged by operation of the brake pedal. The harder the brakes are applied, the less mobile the vehicle becomes. The system may be combined with audible delayed alarm signals.

3 Claims, 2 Drawing Sheets

BRAKE SYSTEM FOR PREVENTING UNAUTHORIZED USE OF VEHICLE

FIELD OF THE INVENTION

The present invention relates to vehicle theft alarm and prevention devices, and in particular discloses a system that operates on the brakes of a vehicles to prevent the unauthorized use of a vehicle.

DESCRIPTION OF THE PRIOR TECHNOLOGY

There exist a variety of anti-theft alarms for vehicles. Many comprise an audible alarm that is activated upon a use of the vehicle when the anti-theft system is not disarmed. Such systems can be triggered in many different ways: by pulling out a lock, by sensing motion of the vehicle, by sensing opening of the doors of the vehicle by use of the vehicle's ignition circuit, by sensing disconnection of a trailer's plug from a towing vehicle, or by detecting transient voltage changes caused by activation of the vehicle's lights. Besides the audible alarm that is commonly used to discourage the unauthorized use, there exist systems that transmit an alarm signal to a remote location.

It is usual for an automobile to have a key system for entry into the vehicle, for starting the engine, and for releasing the steering shaft and the transmission controls. There also exist a variety of add-on locks that prevent the turning of the steering wheel or the movement of transmission controls.

None of the prior technology discloses the arrangement of features that comprise this invention.

SUMMARY OF THE PRESENT INVENTION

This invention provides a vehicle alarm and theft prevention system that operates on the brakes of the vehicle. Upon an unauthorized use of the vehicle, the system causes the brakes of the vehicle to remain engaged to the degree to which the user causes them to be engaged by operation of the brake pedal. The harder the brakes are applied, the less mobile the vehicle becomes. This is of greater advantage in preventing theft than merely setting off an alarm, which may go unanswered. The system has advantages over steering wheel locks, in that such locks are immediately apparent to the unauthorized user, and can be circumvented. The delayed but increasing effect of the system of the current invention would typically place the vehicle and the unauthorized user in an unpredictable location in which it would be difficult for the unauthorized user to work on and defeat the system. A similarly delayed lock on the steering would be dangerous. The system may be combined with audible alarm signals.

DETAILED DESCRIPTION

Figure 1:
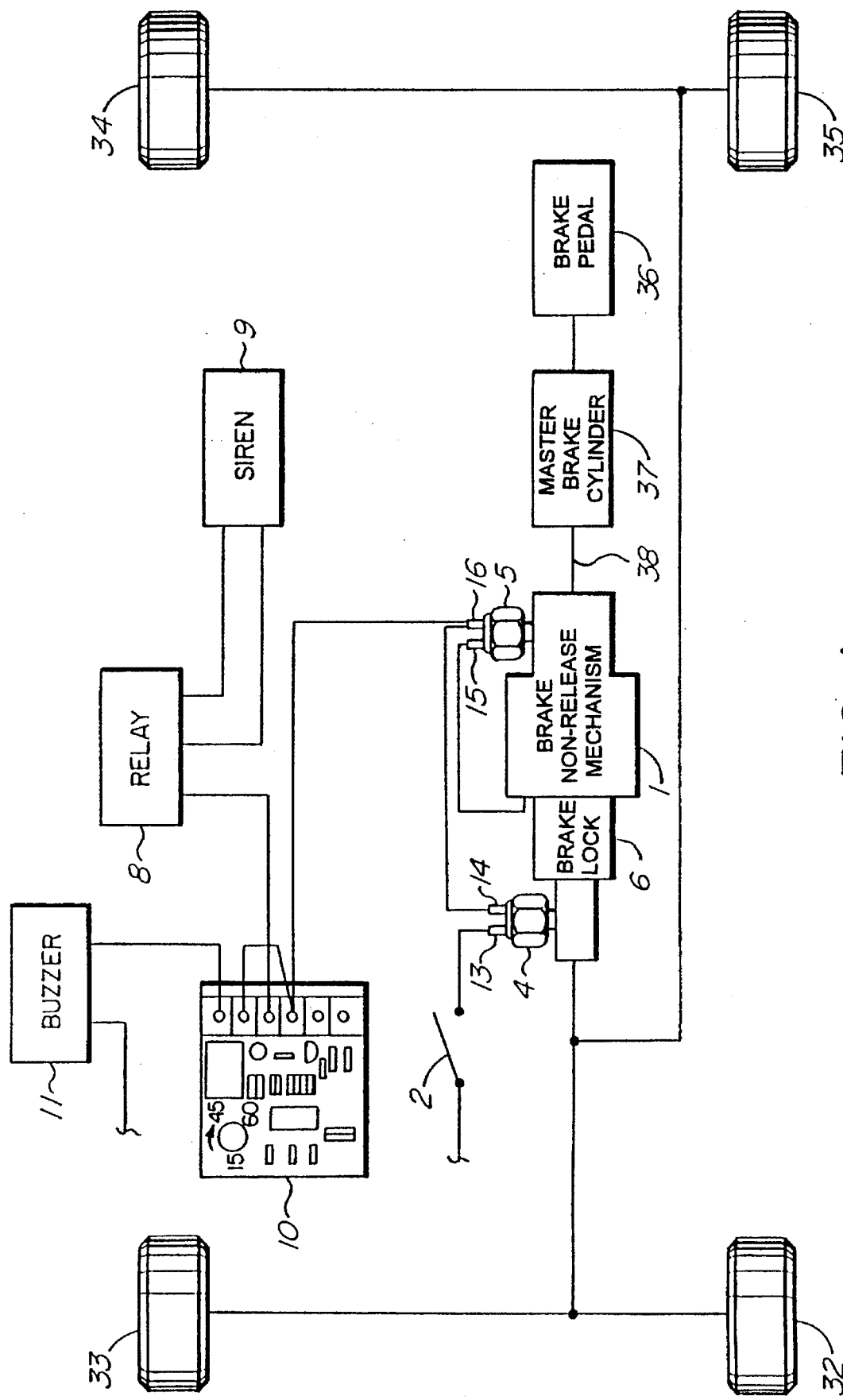
FIG. 1 is a schematic drawing of a preferred embodiment of the vehicle alarm and theft prevention system that operates on the brakes of the vehicle.

Referring to FIG. 1, the system is installed in a vehicle having brake lines 31 that supply brake fluid pressure to the brakes on the wheels 32, 33, 34, and 35 of the vehicle. The brake pedal 36 pumps brake fluid from the master brake cylinder 37 through a brake fluid supply line 38 to a brake non-release mechanism 1 that operates to keep the brakes on to the degree they are pressed into operation by an unauthorized user. The brake non-release mechanism 1 is activated by a combination of an alarm arming switch 2 and increased fluid pressure from the master brake cylinder 37 of the braking system of the vehicle. A low pressure switch 4 on the brake fluid system between the non-release mechanism 1 and the brakes of the vehicle has two electrical contacts. The first contact 13 receives 12 volt power when the system is armed. When the pressure of brake fluid builds, it is sensed by the low pressure switch 4 which then trips and supplies power via the second contact 14 to a hydraulic brake lock 6 in the brake non-release mechanism. The brake lock 6 has a second pressure switch 5, having a third contact 15 connected by electrical wire to the second contact 14 on the pressure switch 4. The second pressure switch 5 senses whether there is brake fluid pressure from application of the brake pedal of the vehicle. After the system is armed and the low pressure switch 4 is tripped the second pressure switch 5 cuts power to a solenoid in the hydraulic brake lock 6 when there is no brake fluid pressure and reactivates the solenoid when there is brake fluid pressure. The second pressure switch 5 on the brake non-release mechanism 1 is also electrically connected by the fourth contact 16 to signal a delay timer 10 that in turn signals a siren alarm relay 8 to activate a siren 9 after a pre-set period of time after the brake non-release mechanism 1 is activated. A suitable delay timer 10 is the 6030 Universal Timer Board manufactured by Altronix Corporation. A suitable brake lock is the MICO brake lock from MICO Corporation. The delay timer 10 is installed with several electical connections. It is powered by the vehicle's battery. It has a wire connection to a buzzer 11 that comes on immediately upon ignition power being turned on in the car, to warn that the system has not been disarmed for vehicle use. It has a wire connection to the siren alarm relay 8 that becomes hot after an adjustable delay period. The siren alarm relay would then provide 12 volt power to the siren 9. The delay timer 10 is connected by electrical wire to the second pressure switch 5.

Figure 2:
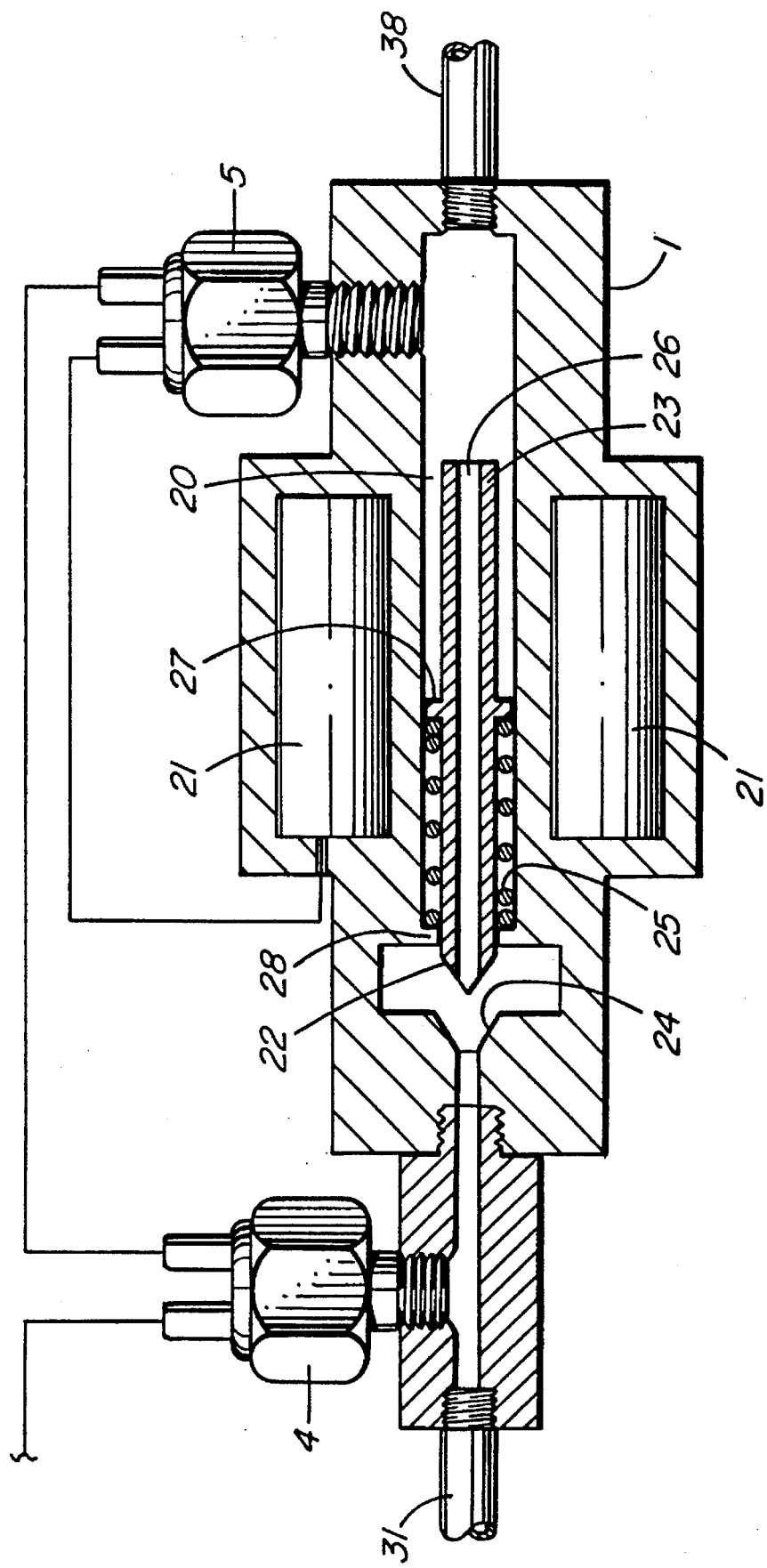
FIG. 2 is a cross-section of the brake non-release mechanism of the device of FIG. 1.

Referring to FIG. 2, the brake non-release mechanism comprises the low pressure switch 4, the second pressure switch 5, and a hydraulic brake lock comprising a brake fluid channel 20, a solenoid 21, a valve face 22 on a plunger 23, and a valve seat 24. When the solenoid 21 is activated via the second pressure switch 5, the solenoid 21 causes the valve face 22 to push onto the valve seat 24, keeping brake fluid pressure on the brakes and preventing the brake fluid from moving back from the brakes through the brake fluid tubing toward the master brake cylinder of the vehicle. The brake fluid pressure thus remains on the brakes even after the brake pedal is released and the pressure drops in the brake fluid channel 20, until the brake non-release mechanism is switched off electrically. When power is cut off, the solenoid 21 is de-activated and no longer causes the valve face 22 to push onto the valve seat and the spring 25 on the plunger 23 between the channel lips 28 and 29 and the plunger rim 27 causes the plunger 23 and the valve face 22 to move back from the valve seat 24, allowing the pressurized brake fluid to move back from the brakes toward the master cylinder via the brake fluid channel 20. The plunger 23 is hollow, having an inner channel 26 through which brake fluid is pumped by the operation of the brake pedal in order to assist the spring 25 push back the plunger 23 and the valve face 22 move back from the valve seat 24 after the deactivation of the solenoid.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. A brake system for preventing unauthorized use of a vehicle comprising a brake non-release mechanism activated by a combination of an alarm arming switch and increased fluid pressure from a master brake cylinder within a braking system of the vehicle, comprising:

a) a low pressure switch in the braking system located between the non-release mechanism and the brakes of the vehicle, the low pressure switch having a first electrical contact that receives electrical power when the brake system is armed and that trips upon a threshold of brake fluid pressure and provides power to a second electrical contact that is electrically connected to a hydraulic brake lock in the brake non-release mechanism;

b) a second pressure switch in the hydraulic brake lock, having a third electrical contact connected by electrical wire to the second electical contact, and providing power to activate a solenoid in the hydraulic brake lock when the second pressure swatch senses brake fluid pressure from the application of a brake pedal in the vehicle and cutting power, thereby deactivating the solenoid, when there is no such brake fluid pressure sensed.

2. The brake system of claim 1, in which the second pressure swatch is electrically connected by the fourth electrical contact to signal a delay timer that in turn activates a siren alarm after a pre-set period of time after the brake non-release mechanism is activated.

3. The brake system of claim 2, in which the hydraulic brake lock comprises a brake fluid channel, a solenoid, a valve face on a plunger, and a valve seat, in which activation of the solenoid via the second pressure switch causes the valve face to push onto the valve seat keeping brake fluid pressure on the brakes and preventing brake fluid from moving back from the brakes through brake fluid tubing toward the master brake cylinder of the vehicle, until the brake non-release mechanism is switched off electrically, upon which a spring on a plunger causes the plunger and the valve face to move back from the valve seat and allows pressurized brake fluid to move back from the brakes toward the master cylinder via the brake fluid channel.

* * * * *